United States Patent
Madamopoulos et al.

(10) Patent No.: US 9,485,480 B2
(45) Date of Patent: Nov. 1, 2016

(54) LASER BASED PROJECTION DISPLAY SYSTEM

(75) Inventors: Nicholas Madamopoulos, Somerset, NJ (US); Fotini Papageorgiou, Somerset, NJ (US)

(73) Assignee: The Research Foundation of the City University of New York, New York, NY (US)

(*) Notice: Subject to any disclaimer, the term of this patent is extended or adjusted under 35 U.S.C. 154(b) by 199 days.

(21) Appl. No.: 14/113,016

(22) PCT Filed: May 2, 2012

(86) PCT No.: PCT/US2012/036096
§ 371 (c)(1),
(2), (4) Date: Nov. 22, 2013

(87) PCT Pub. No.: WO2012/151262
PCT Pub. Date: Nov. 8, 2012

(65) Prior Publication Data
US 2014/0104578 A1    Apr. 17, 2014

Related U.S. Application Data

(60) Provisional application No. 61/481,547, filed on May 2, 2011.

(51) Int. Cl.
*G03B 21/20* (2006.01)
*H04N 9/31* (2006.01)

(52) U.S. Cl.
CPC .......... *H04N 9/3129* (2013.01); *G03B 21/208* (2013.01); *G03B 21/2033* (2013.01); *H04N 9/315* (2013.01); *H04N 9/3161* (2013.01); *H04N 9/3164* (2013.01)

(58) Field of Classification Search
CPC  G03B 21/2033; G03B 21/20; G03B 21/208; G03B 21/2053; G03B 21/206; H04N 9/3129; H04N 9/3161; H04N 9/3164; H04N 9/315; H04N 9/3197; H04N 9/3194
USPC .............................................. 353/85, 94, 7, 8
See application file for complete search history.

(56) References Cited

U.S. PATENT DOCUMENTS

| | | |
|---|---|---|
| 5,864,644 A | 1/1999 | Digiovanni et al. |
| 6,005,717 A | 12/1999 | Neuberger et al. |
| 6,434,302 B1 | 8/2002 | Fidric et al. |

(Continued)

OTHER PUBLICATIONS

International Preliminary Report on Patentability dated Nov. 5, 2013 for PCT/US12/36096.

(Continued)

*Primary Examiner* — William C Dowling
*Assistant Examiner* — Ryan Howard
(74) *Attorney, Agent, or Firm* — Burns & Levinson LLP; Orlando Lopez

(57) ABSTRACT

A laser projection system including one or more pluralities of laser sources, each plurality of laser sources emitting light having substantially a different predetermined wavelength in the visible range, a fiber optic laser beam combiner combining outputs of at least one of the pluralities of laser sources into one optical fiber, a fiber-optic delivery component coupled to the one optical fiber and one or more spatial light modulators, and one or more homogenizing optical elements, and one or more optical lens system for projecting the associated images on a screen.

13 Claims, 15 Drawing Sheets

(56) References Cited

U.S. PATENT DOCUMENTS

| | | |
|---|---|---|
| 6,648,475 B1* | 11/2003 | Roddy et al. .................. 353/31 |
| 7,355,657 B2 | 4/2008 | Chilla et al. |
| 2002/0126479 A1 | 9/2002 | Zhai et al. |
| 2005/0041000 A1* | 2/2005 | Plut ................................. 345/39 |
| 2005/0078353 A1 | 4/2005 | Komine |
| 2009/0052014 A1 | 2/2009 | Chou |
| 2009/0109698 A1* | 4/2009 | Koyata et al. ................ 362/553 |
| 2010/0182573 A1* | 7/2010 | Itoh ..................... G02B 6/4204 353/30 |

OTHER PUBLICATIONS

International Search Report and Written Opinion dated Nov. 14, 2012 for PCT/US12/36096.

Kosterin, A. et al. Tapered fiber bundles for combining high-power diode lasers. Applied Optics 43(19), Jul. 1, 2004: 3893-3900.

\* cited by examiner

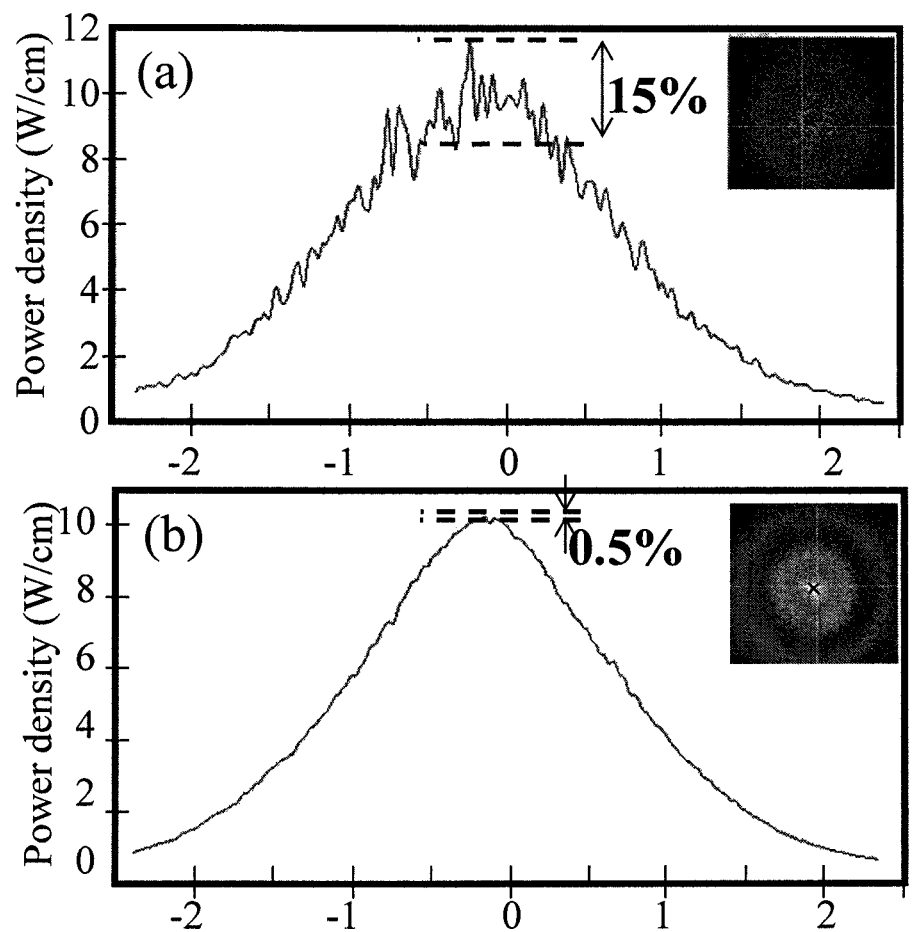
Figs. 14a-b

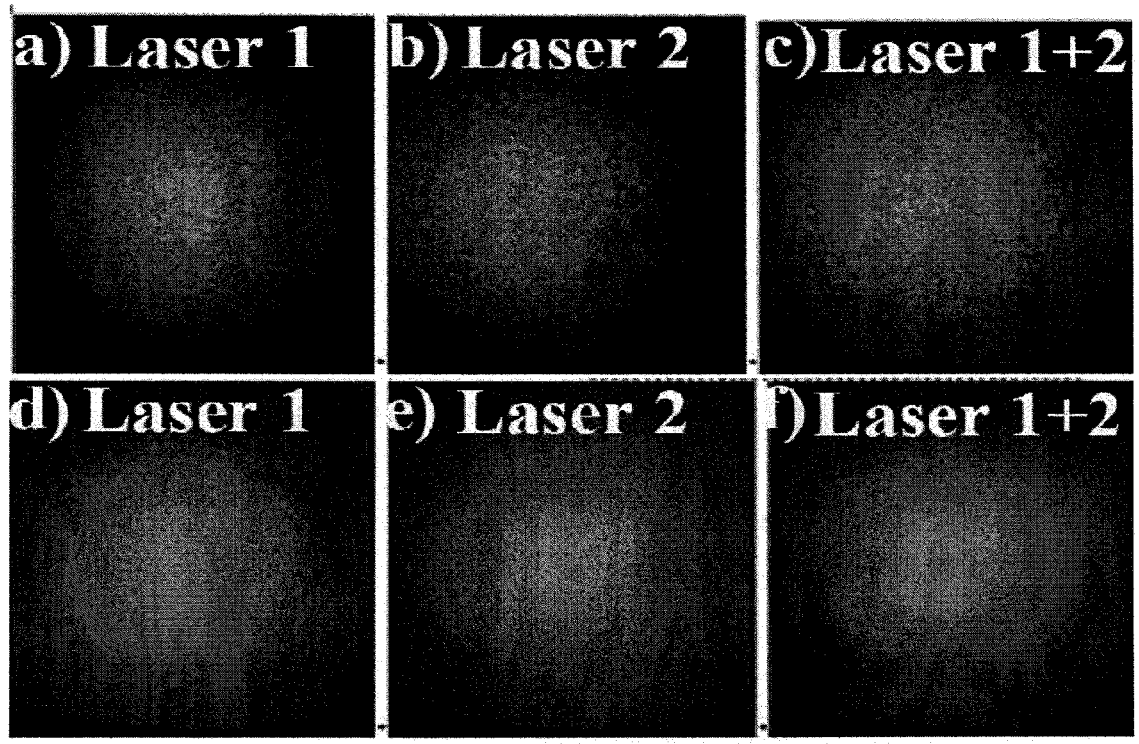
Figs. 15a-f

LASER BASED PROJECTION DISPLAY SYSTEM

CROSS-REFERENCE TO RELATED APPLICATIONS

This application is a U.S. national stage application under 35 U.S.C. 371 of co-pending International Application No. PCT/US12/36096 filed on May 2, 2012 and entitled LASER BASED PROJECTION DISPLAY SYSTEM, which in turn claims priority to U.S. Provisional Patent Application No. 61/481,547 filed on May 2, 2011, which is incorporated by reference herein in its entirety for all purposes.

BACKGROUND

The present teachings generally relate to laser based display systems.

Current projection systems used in large venues such as theaters, and museums, based on lamp-based projection sources, cannot provide the high contrast ratio required for these specialized applications. These projectors typically combine multiple high power lamps (250-500 W) in order to provide sufficient light projection. Xenon lamps of 6000-7000 W have also been employed in digital cinema projectors. However, the large etendue (the spread of the light in area and angle) of the lamps makes for inefficient light collection and projection. Moreover, the cost of ownership for such equipment is considerable due to the high electrical consumption associated with operating and cooling the projectors and the high cost of lamp replacements because high power Xenon lamps (i.e., >3,000) have very short lifetimes (e.g., 750 hours) and relative high cost $4,900 (e.g., www.ProjectorLampExperts.com). Part of the generated emission is wasted as the lamps emit over a very wide spectrum of wavelengths (e.g., from W to IR), and optical filters are required to allow only the three primary colors to be transmitted through the system. The brightest xenon lamp projector in the market uses 20,000 ANSI lumens. The average purchasing cost is $120,000, without the necessary projection lenses. The drawbacks of such a system is the low contrast ratio of 1,800:1, the very short lifetime (e.g., 750 h) and high lamp replacement cost. It is also important to note that lamp based projectors color quality quickly degrades, even if the lifetime of the lamp has not reached its life time limit.

Since the 80's, it was suggested that laser projection systems offer many benefits over other projection technology. Laser light is far more directional, powerful, and coherent than any other light source. Hence, lasers produce an intense beam that is very pure in color. Pure colors produced by red, green, and blue lasers are the primary wavelengths on the boundary of the ICI (CIE) chromaticity diagram, a characteristic that allows a very large gamut of colors (FIG. 1) compared to CRT and TFT LCD technologies. This maximizes the color space available for displaying highly saturated colors. Laser approaches also offer the advantage of stable laser color (wavelength) over the lifetime of the laser, which can reach more than 15,000 hours. In addition, unlike deformable oil films, phosphors, and LCDs, a laser has zero persistence. Moving images in a laser display will not smear or blur, hence high contrast ratios can be achieved (e.g., >15,000:1) Due to the excellent laser beam collimation characteristics, which results in greater depth of focus, it is possible to permit projection on curved surfaces with high resolution. Hence, laser projection promises an increased color gamut, higher luminance, zero persistence, and increased line rates.

Today's typical laser based projection configuration is 30 shown in FIG. 2. The system consists of:
(a) Sources (typically one or two, polarization multiplexed lasers) for each color
(b) Modulation scheme
(c) Optical path delivery
(d) Projection head To date the major research and development effort in improving the system performance has been in the development of new and more powerful laser sources as well as the development of better, more efficient and better contrast ratio modulation schemes. Nevertheless, the major hurdle in the widespread use of laser in video projection systems has been the high cost of the lasers. There have been two main directions to fulfill the need for high optical power lasers to serve as the light source of these systems. These are:

(a) The development of individual diode pumped solid-state lasers (DPSSL), and improved non-linear optical frequency conversion techniques to build efficient and reliable high power visible laser sources. These approaches have a physical/engineering limit to the maximum optical power they can achieve, and in particular of the blue laser.

(b) The development of systems that generate all three primary colors from one laser source. These are based either on disk laser or optical parametric oscillator (OPO) and several non-linear stages to generate high optical powers (e.g., total power 18 W). Nevertheless, these approaches lead to expensive and large laser systems (e.g., 2 m×1.5 m×1 m) that require massive heat dissipation, high electrical power and are vulnerable to laser failures. That is if the laser malfunctions the whole system needs to be repaired and/or replaced.

Due to the different response of the eye to different wavelengths, a balanced white light is difficult to be accomplished. Higher optical powers are required for the red and blue wavelengths compared to the green laser. Hence, often wastage of the green optical power (which is easier to achieve) is required to provide the balanced white light. At the same time, due to the different response of the eye in bright or dark environment the optical power requirements change significantly depending on whether the observer is in a dark or bright room. Hence, there is a need for a system that can offer high contrast and saturation images for simulation and training as well as planetarium applications in both dark and bright environments.

SUMMARY

In accordance with various embodiments of the disclosed subject matter, devices and methods are provided that overcome the above described and other deficiencies of the prior art are disclosed hereinbelow.

In one or more embodiments, the system of these teachings includes a first plurality of laser sources, the first plurality of laser sources emitting light having substantially a first wavelength, a fiber optic laser beam combiner combining outputs of the first plurality of laser sources from multiple input fibers into one output optical fiber, a fiber-optic delivery component coupled to the one optical fiber and one or more spatial light modulators; the one or more spatial light modulators receiving an output from the fiber-optic delivery component, the one or more spatial light modulators enabling image generation and projection.

In another embodiment, the system of these teachings also includes a second plurality of laser sources, the second plurality of laser sources emitting light having substantially a second wavelength, a third plurality of laser sources; the third plurality of laser sources emitting light having substantially a third wavelength, and wherein the fiber optic laser beam combiner combines outputs of the first plurality of laser sources, the second plurality of laser sources and the third plurality of laser sources into the one optical fiber.

In one or more other embodiments, the system of these teachings includes a first plurality of laser sources, the first plurality of laser sources emitting light having substantially a first wavelength, a fiber optic laser beam combiner combining outputs of the first plurality of laser sources into one optical fiber, a fiber-optic delivery component coupled to the one optical fiber, a second plurality of laser sources, the second plurality of laser sources emitting light having substantially a second wavelength, another fiber optic laser beam combiner combining outputs of the second plurality of laser sources into another optical fiber, another fiber-optic delivery component coupled to the another optical fiber, and another spatial light modulator receiving an output from the another fiber-optic delivery component.

In other embodiments, the system of these teachings includes a first plurality of laser sources, the first plurality of laser sources emitting light having substantially a first wavelength, a first fiber optic laser beam combiner combining outputs of the first plurality of laser sources into one optical fiber, a first fiber-optic delivery component coupled to the one optical fiber, a first spatial light modulator receiving an output from the first fiber-optic delivery component, a second plurality of laser sources, the second plurality of laser sources emitting light having substantially a second wavelength, a second fiber optic laser beam combiner combining outputs of the second plurality of laser sources into another optical fiber, a second fiber-optic delivery component coupled to the another optical fiber, and a second spatial light modulator receiving an output from the second fiber-optic delivery component, and a third plurality of laser sources, the third plurality of laser sources emitting light having substantially a third wavelength, a third fiber optic laser beam combiner combining outputs of the third plurality of laser sources into yet another optical fiber, a third fiber-optic delivery component coupled to the yet another optical fiber, and a third spatial light modulator receiving an output from the third fiber-optic delivery component.

A number of other system embodiments are disclosed hereinbelow as well as embodiments for a method of use.

Regarding the system of these teachings, in order for any system to have widespread applicability to more than a few specialized high cost applications it must be manufacturable, and have the potential to lead to lower cost. It is also important for such a system to offer a fault tolerant approach and ease in maintenance and service. These teachings are significantly different from other approaches proposed or demonstrated to date that are focused on developing high optical power laser sources. It allows for easier manufacturing processes since it is based on readily available laser components. Modular manufacturing, testing and servicing of the complete full color projection system leads to simpler and less expensive manufacturing process. In addition the built in redundancy of sources in the system allows for fault tolerant operation.

These teachings can be applied to next generation large-scale laser based display systems for 3D and virtual reality (VR) systems (such as wall-size displays or VR caves) for visualization, simulation and training applications.

In projection systems used for simulation and training of low ambient light conditions (e.g., air plane landings at night) a very high contrast is required. A promising technology is the laser based projection systems. These teachings overcome the major current limitations of limited brightness and high cost solutions offered today. In particular, the efficient combination of lower optical power lasers into a single beam according to these teachings leads to a system that overcomes optical power limitations available by single or dual laser approaches offered today. These teachings also offer the additional advantages of Scalability, Modularity, Wider Gamut and high Dynamic Range in rendering colors, and Fault-tolerance operation:

1. Scalability that allows for pay-as-you-grow approaches.
2. Modularity, which is beneficial from manufacturing, testing and servicing point of view.
3. Fault tolerant system (systems can operate even if one laser fails).
4. Potential for retrofit in current systems.
5. Potential to add additional plurality of lasers operating at a fourth or fifth wavelength Fields that can benefit from these teachings includes military and commercial aviation, ship navigation, truck driving, medical training, digital planetariums, virtual stadiums and theaters.

For a better understanding of the present teachings, together with other and further objects thereof, reference is made to the accompanying drawings and detailed description and its scope will be pointed out in the appended claims.

BRIEF DESCRIPTION OF DRAWINGS

FIGS. 14a-b show a graphical representation of results obtained from one embodiment of the system of these teachings; and FIGS. 15a-f show a graphical representation of other results obtained from one embodiment of the system of these teachings.

DETAILED DISCLOSURE

There is a need in the simulation and training industry for projection systems with long lifetimes, wider color gamuts, high contrast ratio, and high color saturation. Laser-based approaches can provide the desired color stability and range. They permit constant power operation over a narrow wavelength emission with no wasted IR or UV spectral content, minimizing the need for color rebalancing. In addition, lasers allow for faster warm-up times and exhibit lower noise compared to lamp approaches.

The potential use of lasers as sources for digital cinema and projection systems has been the subject of research from many laser development companies. Lasers have been attractive to display manufacturers because they deliver a significantly better image than any other display, and depending on the projection head design they can allow for projection onto any arbitrary surface. Laser based approaches can also easily provide up to 20,000 hours of lifetime. (This provides a large operational cost benefit compared to high power 25 Xenon lamps, which with a 750 h lifetime, would require the use of about 20 lamps to reach an equivalent lifetime of that of the laser, and hence a replacement cost in the order of $98,000 just for lamps (in the time of this writing). In addition, using larger Xenon lamps poses some limits to the scalability of the system because larger Xenon lamps lead to larger etendue for the source and hence a drop in the system brightness.

Figure 1:
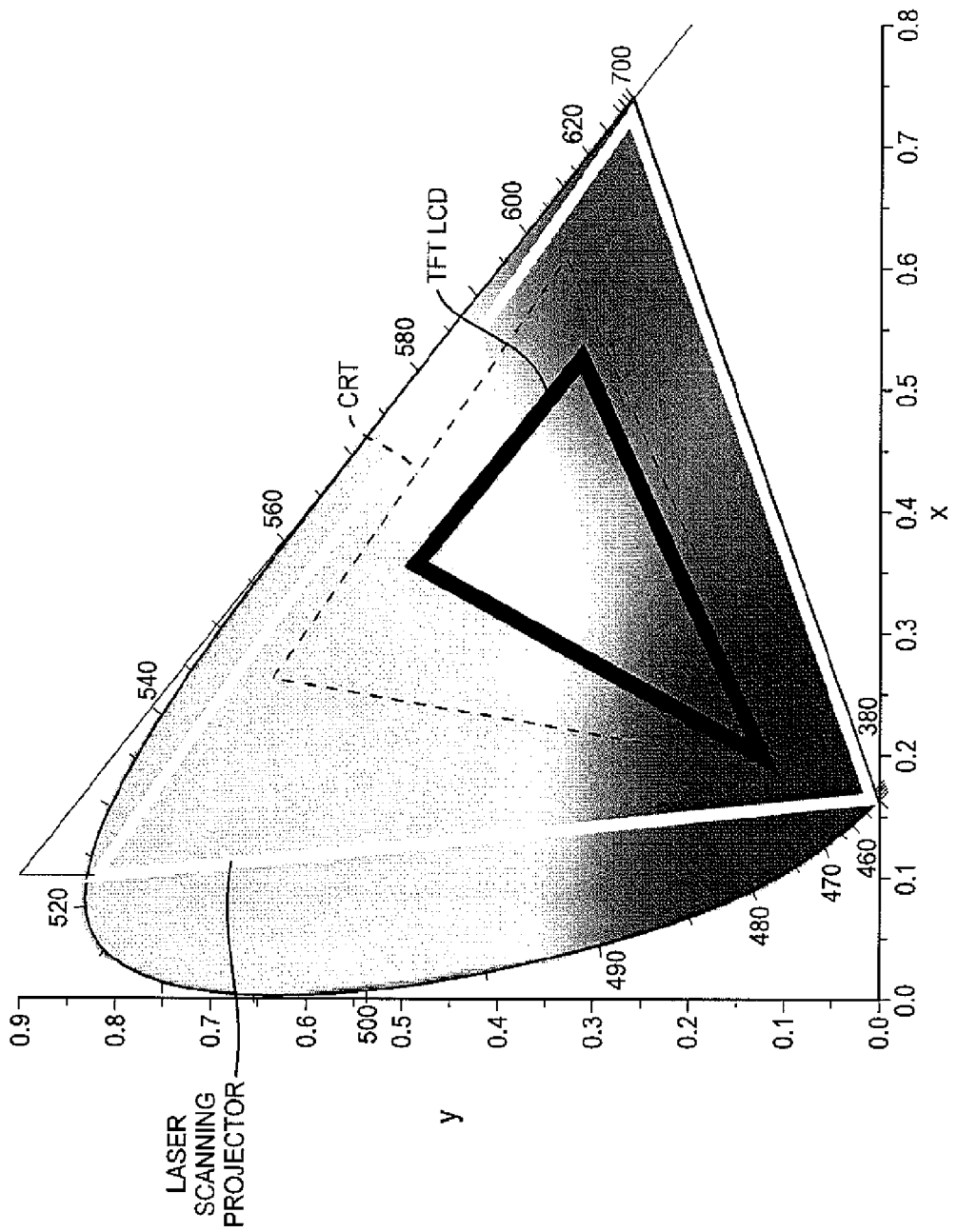
FIG. 1 shows the CIE graph that highlights the wider color gamut obtained using lasers as the optical source.
Figure 2:
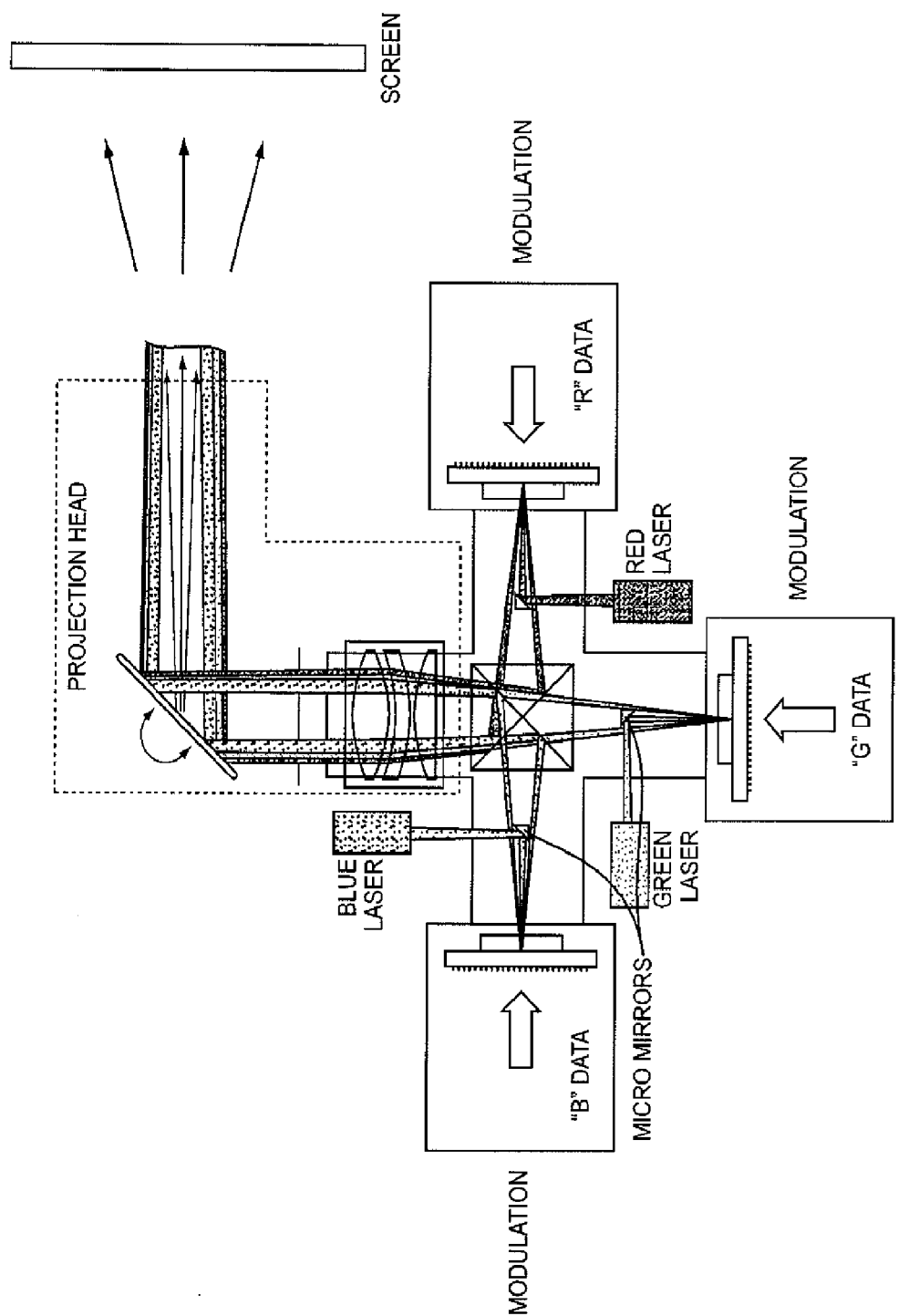
FIG. 2 shows the typical elements of a laser based projection system.
Figure 3:
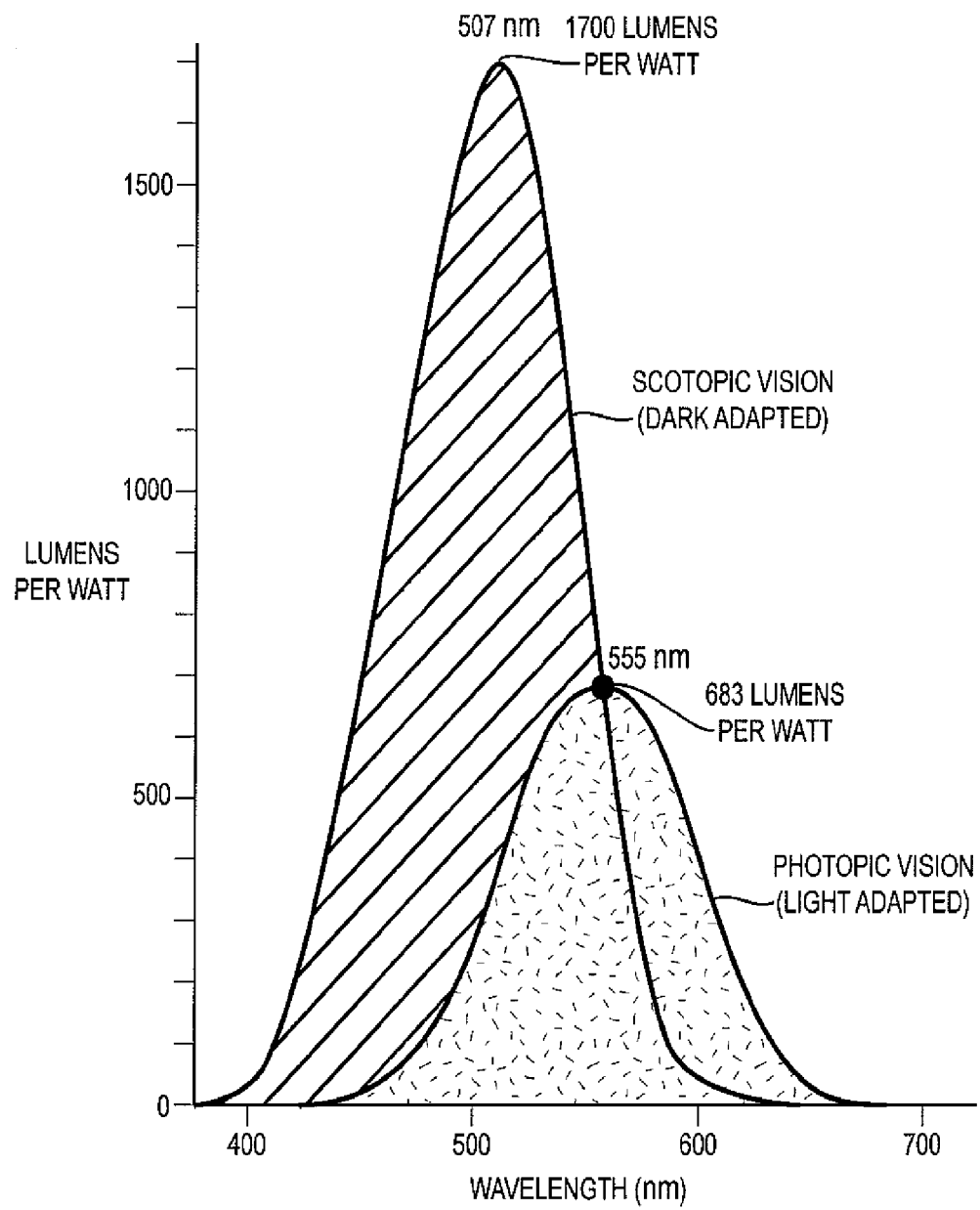
FIG. 3 shows the photoptic and scotoptic curves.

RGB laser based display applications have been expensive because all the approaches have been based to the development of very high power single laser sources. In particular, the blue color has been especially difficult to obtain at high optical powers. Green color laser is easier to be achieved at higher optical powers than blue. In display applications, this difference in optical power is augmented because of the response of the human eye. The human eye is far less sensitive in the blue (B) than in the green (G) for bright light conditions (photoptic vision, FIG. 3). Similarly, for the red (R) laser, even though high powers are readily available, the human eye response makes us perceive the same optical power less intense at red than blue. This becomes more pronounced for low light conditions, where the eye response shifts towards the blue spectrum (scotoptic curve in FIG. 3). Hence, a laser based projection system is limited not only because of the lower achievable optical power but also because of the lower luminous efficacy of the human eye at the wings of the eye response curve.

Figure 4B:
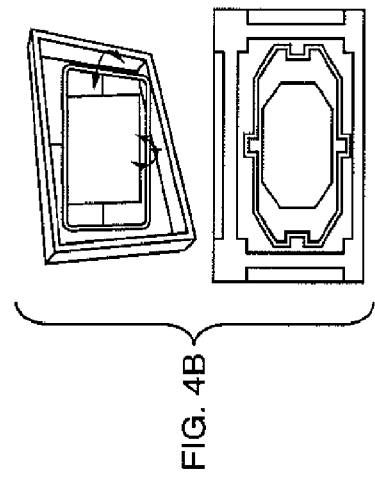
FIGS. 4a-d show the conventional approaches of modulating the laser beam.
Figure 4D:
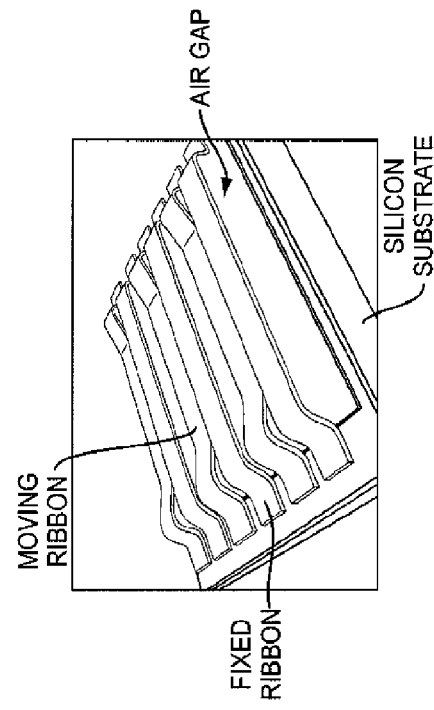
Figure 4A:
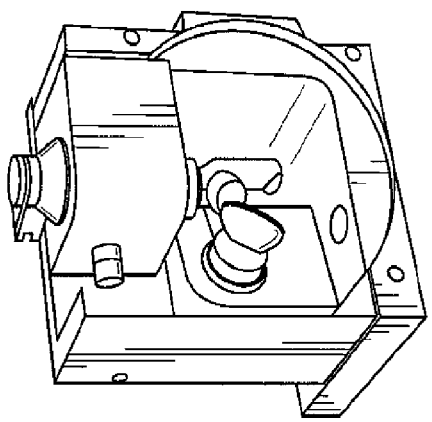
Figure 4C:
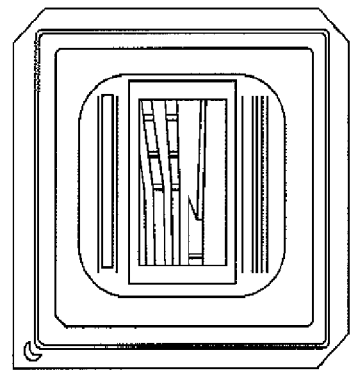

The three primary wavelengths the signals must be encoded or modulated in order to provide the desired image onto a screen. There are three main techniques to accomplish this (a) raster scanning, (b) imaging (with the use of spatial light modulator-SLMs) and (c) hybrid (mixed imaging and scanning pico projectors). In a raster-scanned laser projector, there is no projection lens. The RGB beam is directed to a set of x- and y-scanned mirrors on galvanometers (FIG. 4(a)) or on a single element mirror (e.g., microelectromechanical systems or MEMS) moving in both x- and y-directions (FIG. 4(b)). The beam is translated from the mirror(s) and creates an image on whatever surface it is projected on. By design, the rate of expansion of the single-pixel beam can be matched to the rate that the scanned image size grows. As a result, the projected image is always in focus.

In SLM and imaging approaches the basic design is that one used in small-business projectors. A small SLM, which has an individually addressable modulator for each pixel, is used to create the picture. The SLM is imaged by a projection lens onto the projection surface. Often, three SLMs are used, one for each color, to accomplish higher luminous flux. The first approach is to use different type of spatial light modulators (SLM) (for example, liquid crystal-LC, MEMS-mirrors, grating light valve-GLV), which is similar to the approach used in commercial LCD or DMD (digital micromirror device) projectors. The laser beam is expanded to a size compatible with the size of the SLM, it is spatially modulated by the SLM, and is projected through a projection lens system on the desired screen.

Hybrid imaging and scanning projectors use a one-dimensional spatial light modulator to create a single column of pixels and a one-dimensional (1D) scanner to sweep the column horizontally, thereby creating a 2D image. Like the imaging-type projectors, a projection lens is used to image the SLM onto the projection surface. 1D SLMs of this type include Sony's GLV (grating light valve), Samsung's SOM (spatial optical modulator), and Kodak's GEMS (grating electro-mechanical system).

Current projection display technology approaches have focused on the laser development and/or the SLM/image modulator approaches.

The following detailed description is of the best currently contemplated modes of carrying out these teachings. The description is not to be taken in a limiting sense, but is made merely for the purpose of illustrating the general principles of these teachings, since the scope of these teachings is best defined by the appended claims.

The present teachings will be more completely understood through the following description, which should be read in conjunction with the drawings. In this description, like numbers refer to similar elements within various embodiments of the present disclosure. Within this description, the claims will be explained with respect to embodiments. The skilled artisan will readily appreciate that the methods, apparatus and systems described herein are merely exemplary and that variations can be made without departing from the spirit and scope of the disclosure.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about."

"Spatial light modulators (SLM)," as used herein, includes scanning systems such as galvanometers. MEMS mirror systems, Liquid crystal modulators as well as other spatial light modulators.

The "visible range of wavelengths," as used herein, includes electromagnetic radiation with a wavelength between about 380 nm and about 760 nm.

"Primary colors," as used herein, refers to colors that can not be obtained by mixing other colors. For additive combination of colors, as in laser projection, the primary colors are usually red, green, and blue.

In one or more embodiments, the laser projection system of these teachings includes a first plurality of laser sources, the first plurality of laser sources emitting light having substantially a first wavelength in the visible range, a fiber optic laser beam combiner combining outputs of the first plurality of laser sources into one optical fiber, a fiber-optic delivery component coupled to the one optical fiber and one or more spatial light modulators; the one or more spatial light modulators receiving an output from the fiber-optic delivery component, the one or more spatial light modulators enabling image generation and projection.

In another embodiment, the system of these teachings also includes a second plurality of laser sources, the second plurality of laser sources emitting light having substantially a second wavelength in the visible range, a third plurality of laser sources; the third plurality of laser sources emitting light having substantially a third wavelength in the visible range, and wherein the fiber optic laser beam combiner combines outputs of the first plurality of laser sources, the second plurality of laser sources and the third plurality of laser sources into the one optical fiber.

In another instance, the fiber-optic laser beam combiner is a tapered fiber bundle.

Figure 5:
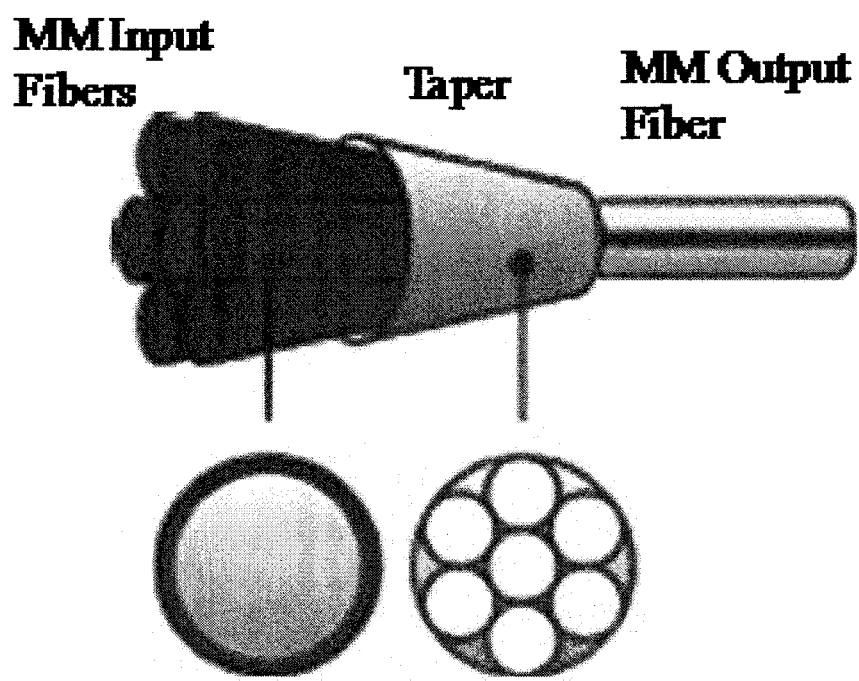
FIG. 5 shows an embodiment of a fiber-optic beam combiner as used in these teachings.

The tapered fiber bundle beam combiner (TFB) is an all fiber optic (FO) device that takes several MM (or SM) input fibers (also called a fiber bundle) and slowly tapers them into a single MM output fiber, with a higher numerical aperture (NA) than the individual input fibers (FIG. 5). Conventional TFBs are designed to operate at near-IR and IR wavelengths with high combining efficiency (e.g., >90%) and have been tested to handle 100 W of optical power. The FO module of these teachings is designed to operate in the visible wavelengths and serves as the delivery system of the optical signal (RGB) to the optics projection head as shown in FIG. 6.

Figure 6:
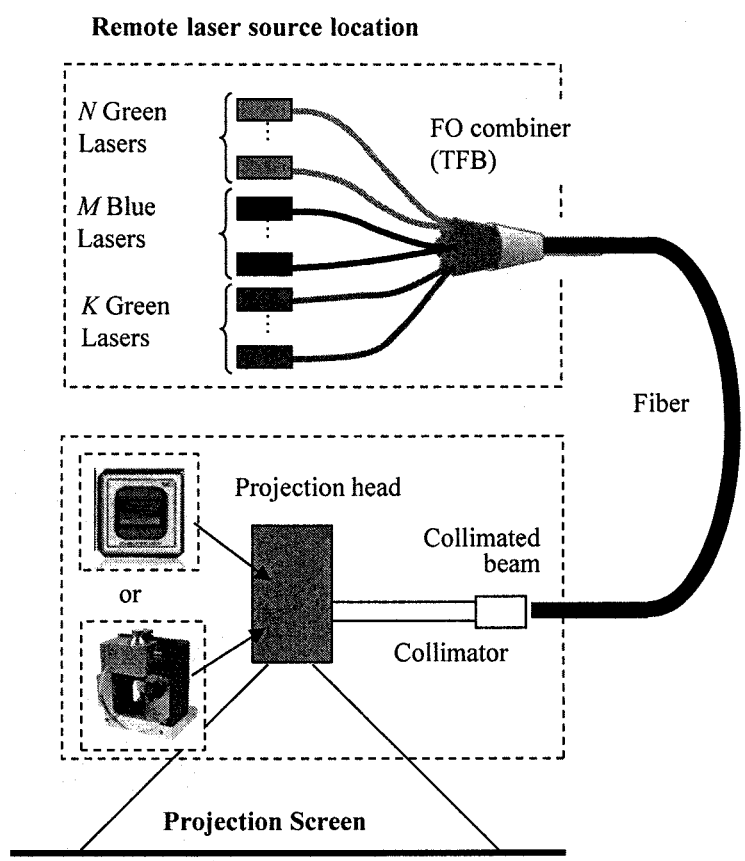
FIG. 6 shows an embodiment of the system of these teachings.

Referring to FIG. 6, in the embodiment shown there in, several lasers—N lasers 20 operating at green, M lasers 25 operating at blue, and K lasers 30 operating at red—are each coupled in one of the input fibers of the FO-combiner 35 (a tapered fiber bundle, referred to as a TFB, in the embodiment shown). The optical signals are coupled through the TFB in the output fiber of the TFB. The output fiber of the TFB 40 can have a larger diameter or it can be a double cladding fiber. Examples include, but not limited to, input fibers of 105 micrometer core diameter, 125 micrometer cladding diameter and numerical aperture of 0.22 and the output fiber a 125 micrometer diameter cladding and a low index polymer that forms a second cladding and provides an NA of 0.45. Another option includes output fibers of 200 micrometer diameter cladding and a low index polymer that forms a second cladding and provides an NA of 0.45. Lower NA options are also possible for the output fiber.

The combined signal propagates through the optical fiber to the location of the projection head 45. At this location the light is first collimated and then propagates through an optical and beam. Each set of colors is modulated in time and hence at any time one, two or all three set of colors can impinge on the pixels of the SLM 50. By time modulating in an on/off mode the set of colors a similar effect as that of a color wheel can be achieved and hence the generation of a plurality of colors can be achieved. Since the optical fiber is multimode it can operate as a integration/homogenizing rod. However if a rectangular shape beam is required a homogenizing rod is required. Proper imaging and projection optics allow the optical beam to propagate through the SLM housing and hit the SLM and project to the remote display screen.

These teachings should be contrasted to conventional techniques that combine optical beams through:

1. Wavelength division multiplexing or dichroic mirrors, but this approach is limited to one beam for each 10 individual wavelength;

2. 50/50 splitters/couplers. This is limited to a combining efficiency of 50% and two optical beams.

3. Polarization multiplexing, where two orthogonal polarizations are combined through a polarization beamsplitter cube. This approach is limited to combining a maximum of two optical beams operating at two orthogonal polarizations.

4. Incoherent beam combining via deflection of different beams from mirrors and redirection to a common projection target. This requires additional SLMs or scanning mirrors.

Note that the beams travel through different physical paths and only overlap at the projection screen.

In another embodiment, the system of these teachings also includes splitting components receiving said output from said fiber-optic delivery component and separating said output into beams of said one primary color, said another primary color and said yet another primary color and three spatial light modulators; a first one of the three spatial light modulators receiving light of one primary color, a second one of the three spatial light modulators receiving light of another primary color; and a third one of the three spatial light modulators receiving light of yet another primary color, the spatial light modulators enabling image generation and projection.

Figure 7:
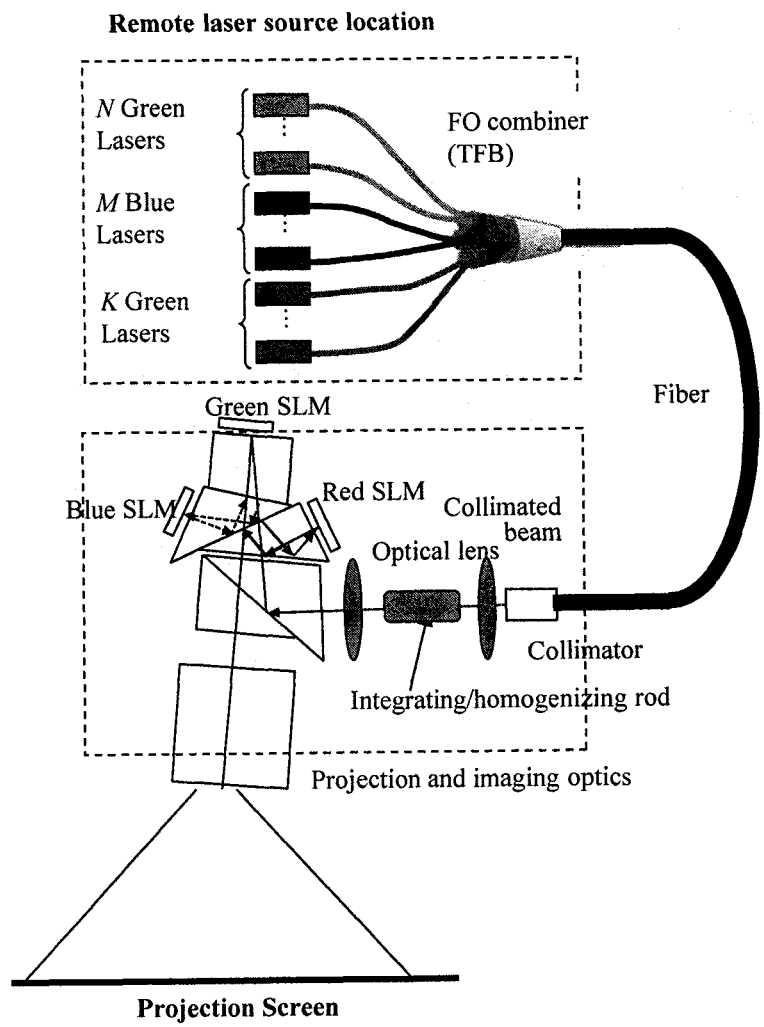
FIG. 7 is a schematic representation of another embodiment of the system of these teachings.

Referring to FIG. 7, the embodiment shown therein has three different SLM for the color and image modulation. This can allow for better control of the image and color quality. In this case the optical combined signal from all sets of colors is split by dichroic filters or an x-cube (a Cross Dichroic Prism (X-cube) is combination of 4 triangular prisms). Each set of colors impinges on a separate SLM 65 and then reimaged and projected through the projection optics to the remote display screen.

In other embodiments, the system of these teachings includes a first plurality of laser sources, the first plurality of laser sources emitting light having substantially a first wavelength, a first fiber optic laser beam combiner combining outputs of the first plurality of laser sources into one optical fiber, a first fiber-optic delivery component coupled to the one optical fiber, a first spatial light modulator receiving an output from the first fiber-optic delivery component, a second plurality of laser sources, the second plurality of laser sources emitting light having substantially a second wavelength, a second fiber optic laser beam combiner combining outputs of the second plurality of laser sources into another optical fiber, a second fiber-optic delivery component coupled to the another optical fiber, and a second spatial light modulator receiving an output from the second fiber-optic delivery component, and a third plurality of laser sources, the third plurality of laser sources emitting light having substantially a third wavelength, a third fiber optic laser beam combiner combining outputs of the third plurality of laser sources into yet another optical fiber, a third fiber-optic delivery component coupled to the yet another optical fiber, and a third spatial light modulator receiving an output from the third fiber-optic delivery component.

Figure 8:
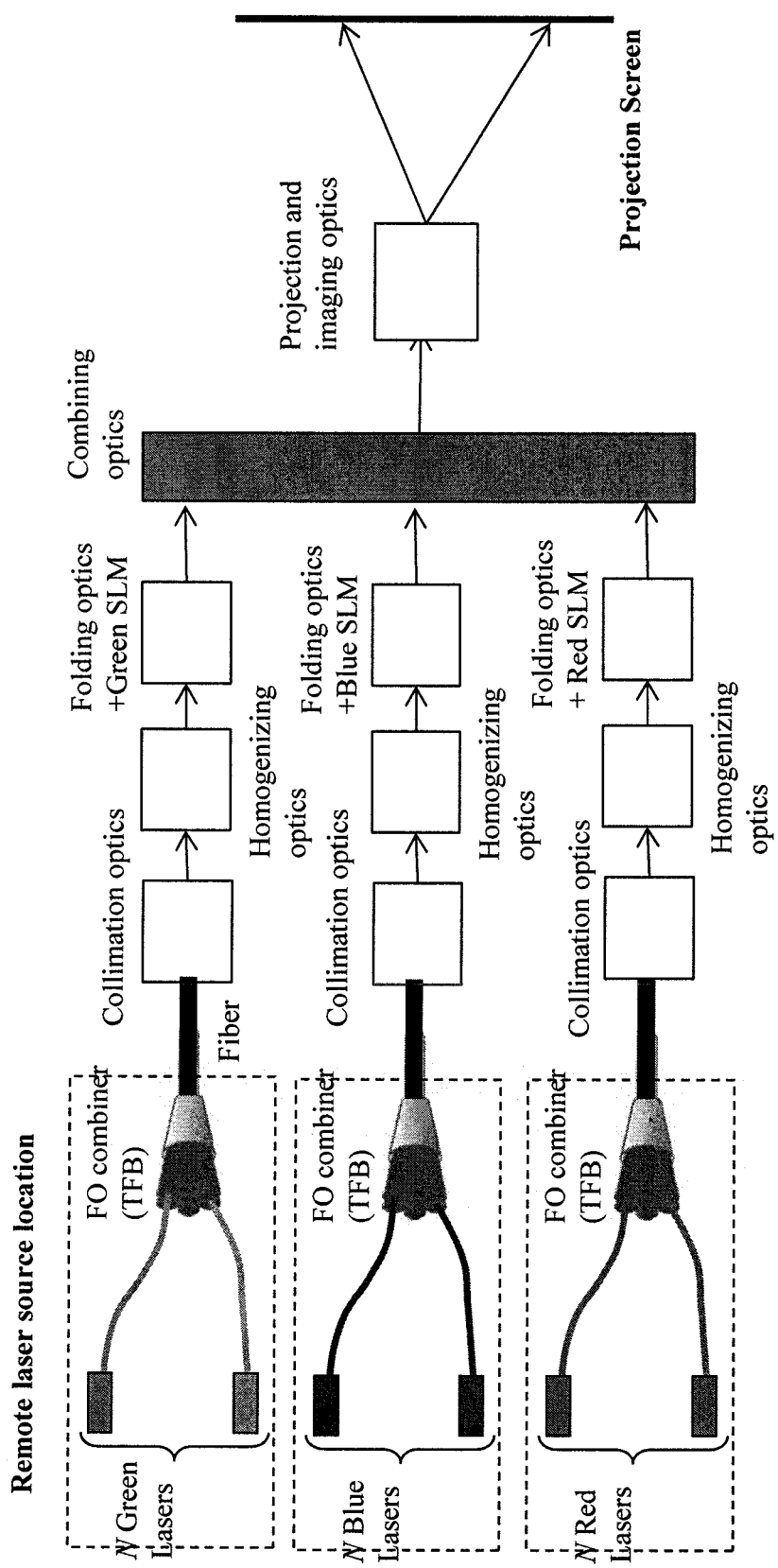
FIG. 8 is a schematic representation of yet another embodiment of the system of these teachings.

Referring to FIG. 8, in the embodiment shown therein, multiple same color lasers our combined with one fiber-optic laser beam combiner (a TFB in the embodiment shown). To accomplish high brightness output beam a larger number of laser is required. This can be achieved by combining multiple same color lasers with one TFB. Hence, more input ports of the TFB are used for the same color compared to the previous configurations. The combined optical signal from each set of colors can then be collimated/homogenized/modulated. The optical signal can be combined with the other colors and through the projection system projected on the remote screen. A first plurality of lasers emitting in the red 70 are combined using a first fiber optic laser beam combiner 75 coupled to a first optical fiber 80 (in this embodiment, the fiber optic delivery components are extensions of the optical fiber in the fiber-optic laser beam combiner). A first spatial light modulator 85 receives the output of the first optical fiber 80. A second plurality of lasers emitting in the blue 90 are combined using a second fiber optic laser beam combiner 95 coupled to a second optical fiber 105 (in this embodiment, the fiber optic delivery components are extensions of the optical fiber in the fiber-optic laser beam combiner). A second spatial light modulator 110 receives the output of the first optical fiber 105. A third plurality of lasers emitting in the green 115 are combined using a third fiber optic laser beam combiner 120 coupled to a third optical fiber 125 (in this embodiment, the fiber optic delivery components are extensions of the optical fiber in the fiber-optic laser beam combiner). A third spatial light modulator 130 receives the output of the third optical fiber 125. In the embodiment shown in FIG. 8, as in other embodiments, conventional collimation optics, conventional homogenizing optics (such as, but not limited to, light pipes, also referred to as homogenizing rods and the homogenizing optics shown in Reinhard Voelkel, Kenneth J. Weible, Laser Beam Homogenizing: Limitations and Constraints, SPIE Europe Optical Systems Design, Sep. 2-5, 2008) and conventional folding optics may be used. Since the optical fiber is multimode it can operate as a integration/homogenizing rod reducing the need for conventional homogenizing optics.

Figure 9:
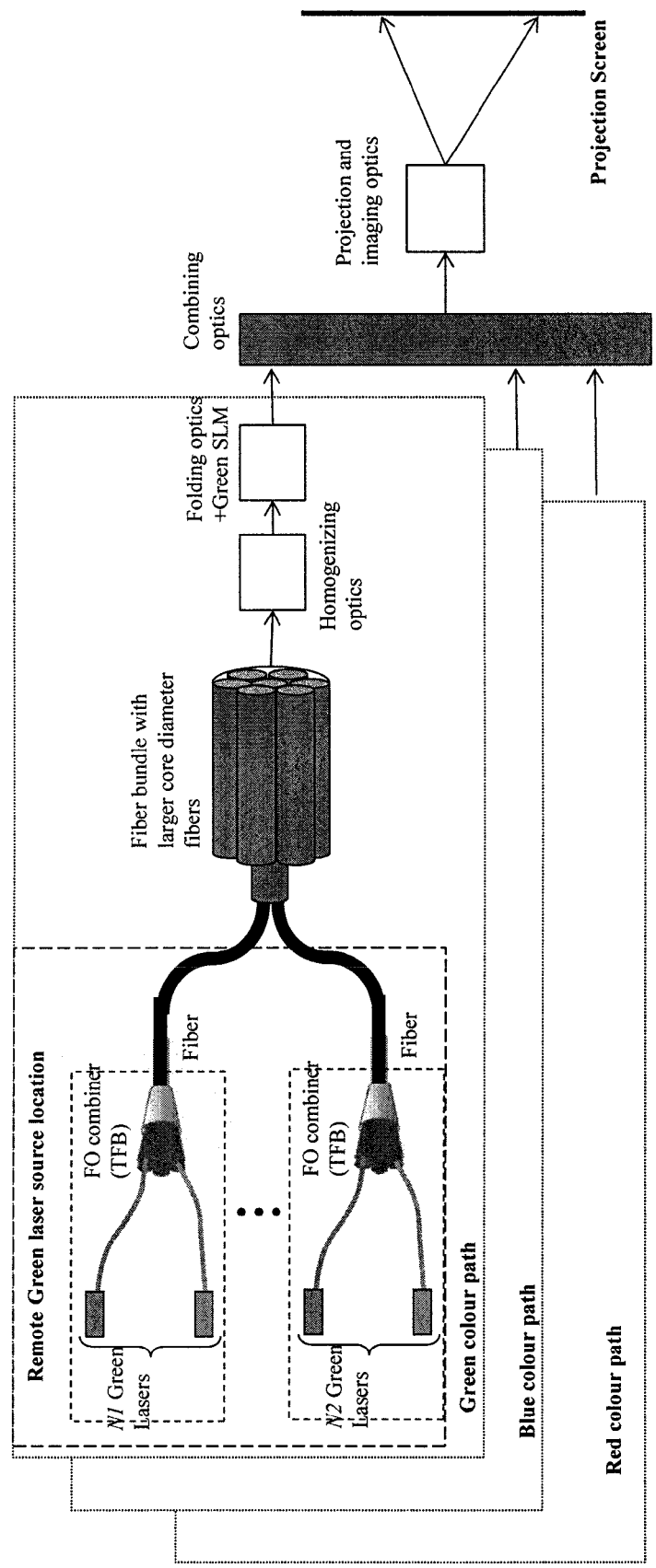
FIG. 9 is a schematic representation of a further embodiment of the system of these teachings.

FIG. 9 shows another embodiment of the system of these teachings. In the embodiment shown in FIG. 9, multiple same color sets of lasers/TFB can be further combined to allow for even higher optical powers. The system is flexible and can be interfaced with existing system or system methods. In particular due to the fact that the system of these teachings uses optical fibers at the output that are 125 or 200 micron in diameter, it can be interfaced with other fiber optic based approaches that use 400 micron fiber as input fibers. In some embodiments of the system of these teachings, output optical fibers have diameters of up to 250 microns. The existing (conventional) systems further bundle a number of those fibers together and their individual outputs are imaged through appropriate optical system. Note that existing conventional systems do not operate based on the tapered fiber bundle approach, but on placing fibers in a bundle. Such systems have achieved high brightness levels but currently face a limit to the total number of fibers they can bundle together, because beyond some point the etendue is severely affected and brightness gains are not achieved. Combining the conventional systems with the system of these teachings can increase the total optical power in each of the optical fibers used in the conventional systems and hence achieve much greater performance gains. The output of the individual larger diameter fibers (from the fiber bundle) are spatially displaced and have to be paced through a homogenization component (fly's eye lens). The light then passes through optics and the SLM before it is combined with the other optical signal (on different colors) and passes through the projection lens.

Figure 10:
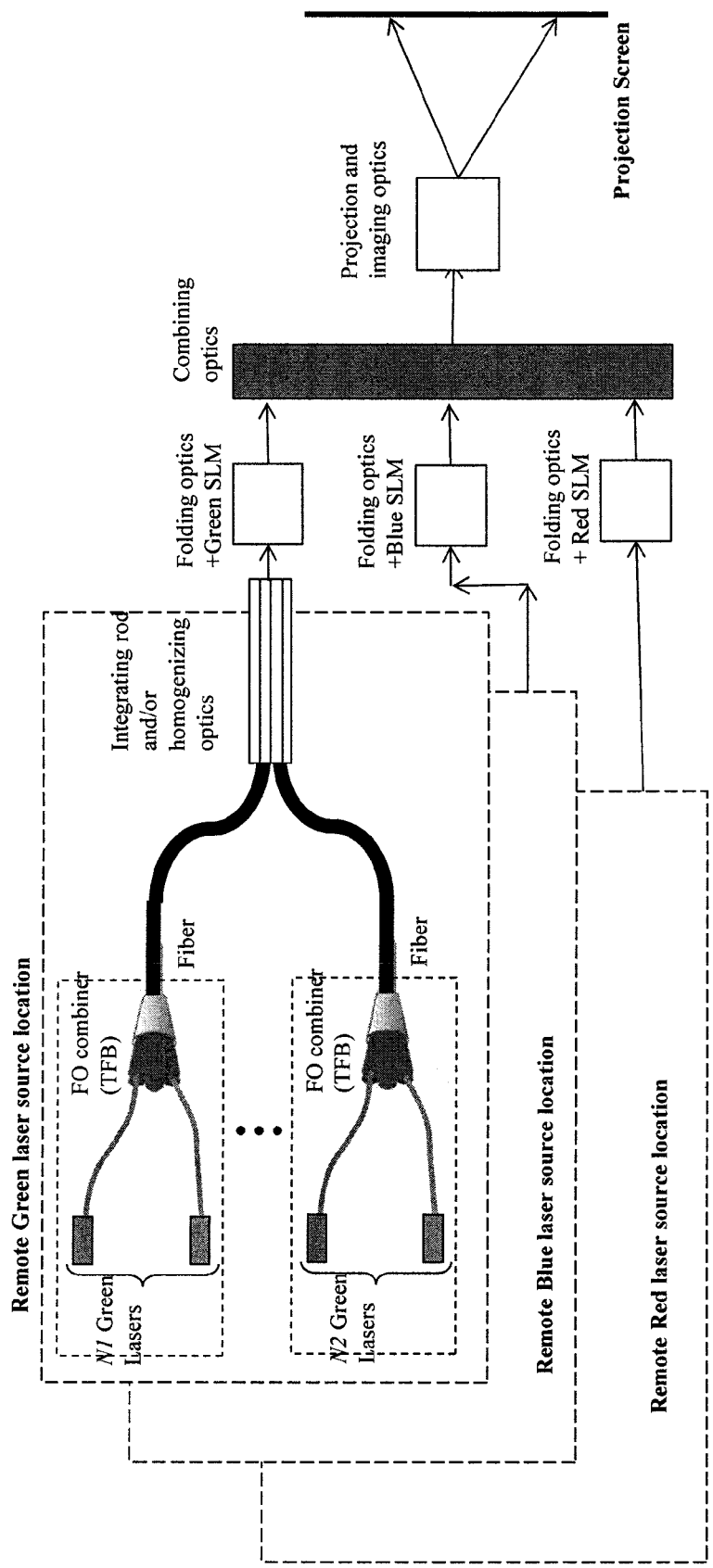
FIG. 10 shows still a further embodiment of the system of these teachings.

FIG. 10 shows yet another embodiment of the system of these teachings in which multiple same color sets of lasers/TFB can be further combined to allow for even higher optical powers. In the embodiment shown therein, instead of using a larger fiber and then a homogenizing component the output fibers from multiple TFBs are bundled together and their signal passes through a homogenizing optical component. This allows for the optical beams to get more uniform and at the same time obtain the required beam profile and shape. The light then passes through optics and the SLM before it is combined with the other optical signal (on different colors) and passes through the projection lens.

In another embodiment of the system of these teachings, the system includes a first plurality of laser sources, the first plurality of laser sources emitting light having substantially a first wavelength, a fiber optic laser beam combiner combining outputs of the first plurality of laser sources into one optical fiber, a fiber-optic delivery component coupled to the one optical fiber, a second plurality of laser sources, the second plurality of laser sources emitting light having substantially a second wavelength, a third plurality of laser sources; the third plurality of laser sources emitting light having substantially a third wavelength, wherein the fiber optic laser beam combiner combines outputs of the first plurality of laser sources, the second plurality of laser sources and the third plurality of laser sources into the one optical fiber, wherein the first wavelength is a wavelength of one primary color, the second wavelength is a wavelength of another primary color and the third wavelength is a wavelength of yet another primary color, polarization beam splitting component receiving the output from the fiber-optic delivery component, the polarization beam splitting components splitting received light into beams of light of two polarizations, one pair of optical power monitoring components; the one pair of optical power monitoring components monitoring optical power of light of one polarization and of another polarization, an optical power control component receiving an output from the optical power monitoring components and adjusting optical power (or equivalently, polarization scrambling) such that optical power in the one polarization is about equal to optical power in the another polarization (polarization scrambling can be accomplished by moving the optical fibers using an air drift), a polarization combining component combining a beam of light of the one polarization with a beam of light of the another polarization, after the adjusting of optical power and two spatial light modulators, one spatial light modulator modulating light of the one polarization and another spatial light modulator modulated light of the another polarization. Due to the plurality of lasers sources and the ability to use polarization scrambling techniques by moving the optical fibers using an air drift, the embodiment disclosed hereinabove can be used to generate three dimensional and stereoscopic images. The combined optical signal at each primary color (e.g., R, G, B) is split into two portions (parallel and perpendicular polarization) using a polarization beamsplitting cube. The amount of optical power is monitored by tapping small portion of the optical signal (in one embodiment tapping a small portion of the optical signal is performed with a small beam splitter that provides a small portion of the beam to a detector; one is the detector is calibrated, being power can be monitored). A feedback control mechanism adjusts the polarization scrambling so that the two portions of the split signal is equal. (in one embodiment, the feedback control mechanism receives the output of the detectors and obtains a reading of power or intensity of each polarization; the comparison, from a comparison component, of the difference in power or intensity between the two polarizations provides a feedback signal that is provided to a feedback circuit that sends a signal to the component used for polarization scrambling). Then the two sets of polarization components for each signal are combined and the vertically polarized light is spatially modulated by a spatial light modulator, and the horizontally polarized light is modulated by a second spatial light modulator. Hence, polarization based 3D images can be generated.

In another embodiment, the laser projection system of these teachings includes a first plurality of laser sources, the first plurality of laser sources emitting light having substantially a first wavelength, a fiber optic laser beam combiner combining outputs of the first plurality of laser sources into one optical fiber, a fiber-optic delivery component coupled to the one optical fiber, a second plurality of laser sources, the second plurality of laser sources emitting light having substantially a second wavelength, a third plurality of laser sources; the third plurality of laser sources emitting light having substantially a third wavelength, wherein the fiber optic laser beam combiner combines outputs of the first plurality of laser sources, the second plurality of laser sources and the third plurality of laser sources into the one optical fiber, wherein the first wavelength is a wavelength of one primary color, the second wavelength is a wavelength of another primary color and the third wavelength is a wavelength of yet another primary color, splitting components receiving said output from said fiber-optic delivery component and separating said output into beams of said one primary color, said another primary color and said yet another primary color, polarization beam splitting components; one polarization beam splitting component receiving light of said one primary color, said another polarization beam splitting component receiving light of said another primary color; and said another polarization beam splitting component receiving light of said yet another primary color, said polarization beam splitting components splitting received light into beams of light of two polarizations, optical power monitoring components, one pair of optical power monitoring components monitoring optical power of light of said one primary color of one polarization and of another polarization, another pair of optical power monitoring components monitoring optical power of light of said another primary color of one polarization and of another polarization, yet another pair of optical power monitoring components monitoring optical power of light of said yet another primary color of one polarization and of another polarization, an optical power control component receiving an output from the optical power monitoring components and adjusting optical power (or equivalently, polarization scrambling) such that optical power in the one polarization is about equal to optical power in the another polarization for light of said one primary color and light of said another primary color and for light of said yet another primary color (polarization scrambling can be accomplished by moving the optical fibers using an air drift), and at least three pairs of spatial light modulators; one spatial modulator of a first pair receiving light of the one primary color of the one polarization and another spatial light modulator of the first pair receiving light of the another polarization of the one primary color, one spatial light modulator of the second pair receiving light of the another primary color of the one polarization and another spatial light modulator of the second pair receiving light of the another primary color of the another polarization; and one second light modulator of the third pair receiving light of the yet another primary color of the one polarization and of the another polarization, after optical power has been adjusted by the optical power control component; each pair of the spatial light modulators modulating light of the one polarization and the another polarization separately.

In one or more embodiments, the laser projection system of these teachings includes a first plurality of laser sources, the first plurality of laser sources emitting light having substantially a first wavelength, a first fiber optic laser beam combiner combining outputs of the first plurality of laser sources into one optical fiber, a first fiber-optic delivery component coupled to the one optical fiber, a first spatial light modulator receiving an output from the first fiber-optic delivery component, a second plurality of laser sources, the second plurality of laser sources emitting light having substantially a second wavelength, a second fiber optic laser beam combiner combining outputs of the second plurality of laser sources into another optical fiber, a second fiber-optic delivery component coupled to the another optical fiber, and a second spatial light modulator receiving an output from the second fiber-optic delivery component, and a third plurality of laser sources, the third plurality of laser sources emitting light having substantially a third wavelength, a third fiber optic laser beam combiner combining outputs of the third plurality of laser sources into yet another optical fiber, a third fiber-optic delivery component coupled to the yet another optical fiber, a number of polarization beam splitting components, one polarization beam splitting component receiving light of the one primary color from the fiber-optic delivery component, another polarization beam splitting component receiving light of the another primary color from the another fiber-optic delivery component, and another polarization beam splitting component receiving light of the yet another primary color from the yet another fiber-optic delivery component, each one of the polarization beam splitting components splitting received light into beams of light of two polarizations, optical power (or equivalently, intensity) monitoring components, one pair of optical power monitoring components monitoring optical power of light of the one primary color of one polarization and of another polarization, another pair of optical power monitoring components monitoring optical power of light of the another primary color of one polarization and of another polarization, yet another pair of optical power monitoring components monitoring optical power of light of the yet another primary color of one polarization and of another polarization, an optical power control component receiving an output from the optical power monitoring components and adjusting optical power (polarization scrambling) such that optical power in the one polarization is about equal to optical power in the another polarization for light of the one primary color and light of the another primary color and for light of the yet another primary color, a beam combining component combining light of the one primary color of the one polarization and light of the another primary color of the one polarization and light of the yet another primary color of the one polarization into combined light of the one polarization and combining light of the one primary color of the another polarization and light of the another primary color of the another polarization and for light of the yet another primary color of the another polarization into combined light of the another polarization and a pair of spatial light modulators, one spatial modulator from the pair receiving the combined light of the one polarization and another spatial light modulator from the pair receiving combined light of the another polarization.

Figure 11:
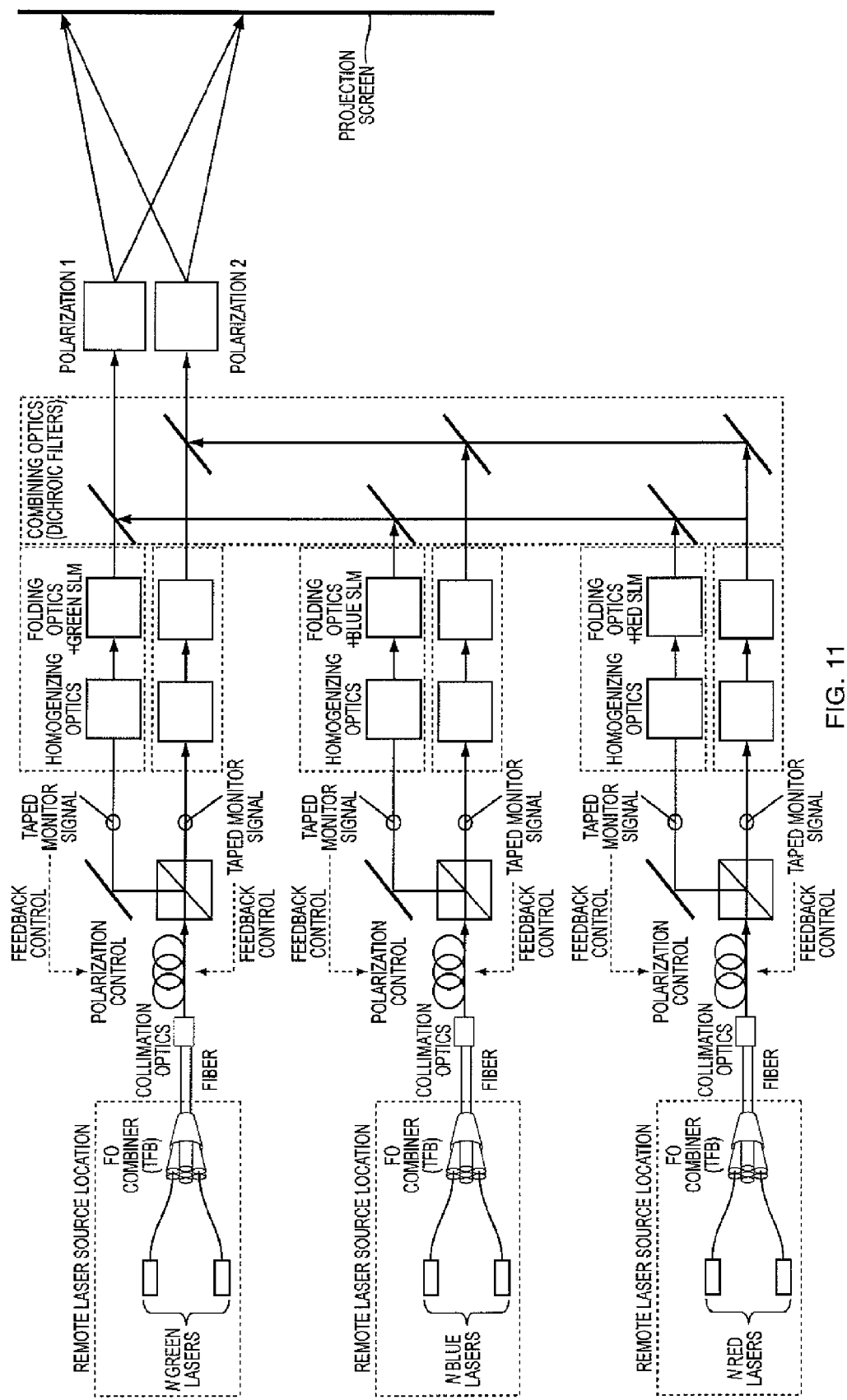
FIG. 11 shows yet a further embodiment of the system of these teachings.

FIG. 11 shows one embodiment of the system of these teachings in which two spatial light modulators receive light of different polarizations. Referring to FIG. 11, the embodiment shown therein includes one subsystem 210 that provides the light of one primary color, light of another primary color and light of yet another primary color. In the embodiment shown in FIG. 11, that subsystem 210 includes a first plurality of laser sources, the first plurality of laser sources 135 him emitting light having substantially a first wavelength corresponding to green light, a first fiber optic laser beam combiner (TFB) 150 combining outputs of the first plurality of laser sources into a first optical fiber 152, a first fiber-optic delivery component coupled to the first optical fiber (in the embodiment shown, the fiber optic delivery component is the same as the optical fiber from the TFB), a second plurality of laser sources 140, the second plurality of laser sources emitting light having substantially a second wavelength corresponding to blue light, a second fiber optic laser beam combiner (TFB) 155 combining outputs of the second plurality of laser sources into a second optical fiber 157, a second fiber-optic delivery component coupled to the second optical fiber (in the embodiment shown, the fiber optic delivery component is the same as the optical fiber from the TFB), and a third plurality of laser sources 145 the third plurality of laser sources emitting light having substantially a third wavelength corresponding to red light, a third fiber optic laser beam combiner (TFB) 160 combining outputs of the third plurality of laser sources into a third optical fiber 162, a third fiber-optic delivery component coupled to the third optical fiber (in the embodiment shown, the fiber optic delivery component is the same as the optical fiber from the TFB). The first optical fiber 152 is coupled to a polarization beam splitter 165, the second optical fiber 157 is coupled to a polarization beam splitter 170 and the third optical fiber 162 is coupled to a polarization beam splitter 175. One polarization beam splitting component 165 receives green light from the first optical fiber 152 and splits the received green light into green light of one polarization and green light of another polarization. Another polarization beam splitting component 170 receives blue light from the second optical fiber 157 and splits the received blue light into blue light of one polarization and blue lights of another polarization. Yet another polarization beam splitting component 175 receives red light from the third optical fiber 162 and splits the received red light into red light of one polarization and red light of another polarization. The embodiment shown also includes optical power (or equivalently, intensity) monitoring components, one pair of optical power monitoring components 185 monitoring optical power of light of the Green color of one polarization and of another polarization, another pair of optical power monitoring components 185 monitoring optical power of light of the blue color of one polarization and of another polarization, yet another pair of optical power monitoring components 185 monitoring optical power of light of the red color of one polarization and of another polarization. An optical power control component 180 receives outputs from the optical power monitoring components and adjusts optical power (polarization scrambling) such that optical power in the one polarization is about equal to optical power in the another polarization for light of the green color and light of the blue color and for light of the red color. The adjusted light of the green color of one polarization and adjusted light of the green color of the other polarization, the adjusted light of the blue color of one polarization and adjusted light of the blue color of the other polarization and the adjusted light of the red color of one polarization and the adjusted side of the red color of the other polarization are provided to a beam combining component 190 that combines them into combined light of the one polarization and into combined light of the other polarization. The embodiment shown in FIG. 11 also includes a pair of spatial light modulators, one spatial modulator 195 from the pair receiving the combined light of the one polarization and another spatial light modulator 205 from the pair receiving combined light of the another polarization.

Figure 12:
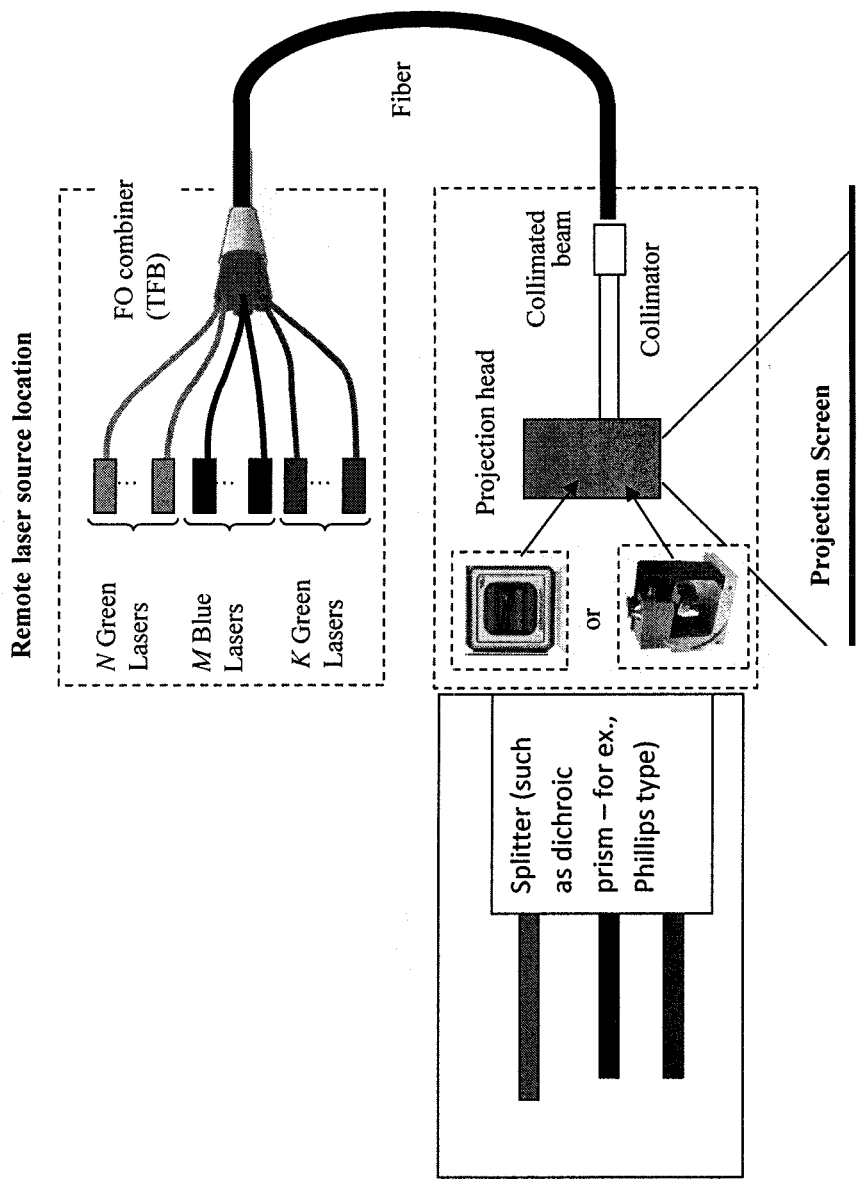
FIG. 12 is a schematic representation of one embodiment of a component of the embodiment of the system of these teachings shown in FIG. 11.

As shown in FIG. 12, the subsystem 210 can be replaced by a first plurality of laser sources 215, the first plurality of laser sources emitting Green light, a fiber optic laser beam combiner 230 (a TFB in the embodiment shown) combining outputs of the first plurality of laser sources into one optical fiber 235, a fiber-optic delivery component coupled to the one optical fiber (in the embodiment shown, the fiber optic delivery component is the same as the optical fiber from the TFB), a second plurality of laser sources 220, the second plurality of laser sources emitting blue light, a third plurality of laser sources 225, the third plurality of laser sources emitting red light, wherein the fiber optic laser beam combiner 230 combines outputs of the first plurality of laser sources, the second plurality of laser sources and the third plurality of laser sources into the one optical fiber 235. The output of the one optical fiber 235 is provided to a splitter component 240 that splits the combined light into green light 245, blue light 250, and red light 255. The green light 245 can be coupled to a fiber, the blue light 250 can be provided to another fiber, and the red light 255 can be provided to yet another fiber. Those fibers are the outgoing fibers from subsystem 210 and become the inputs to the rest of FIG. 11.

Figure 13:
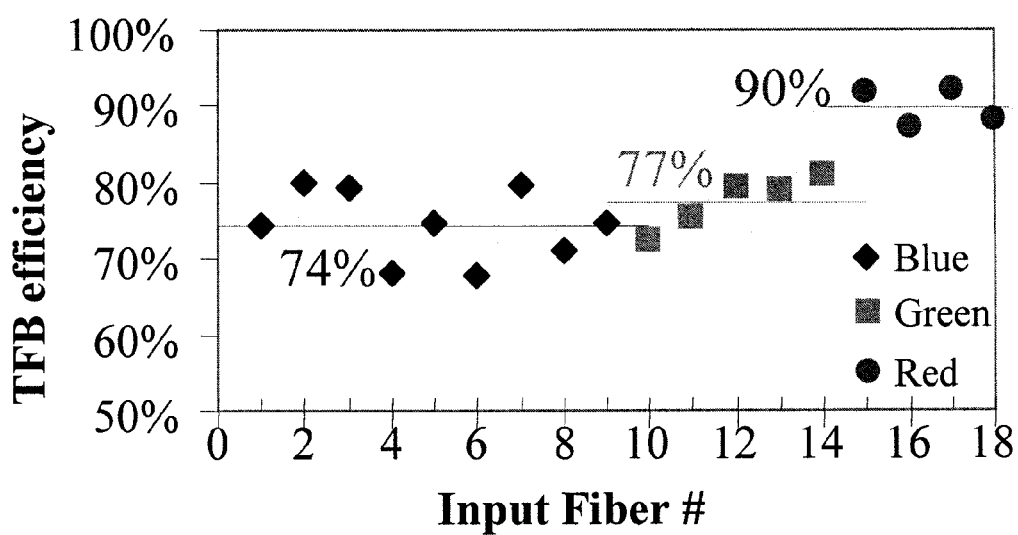
FIG. 13 is a graphical representations of results obtained using one component of embodiments of the system of these teachings.

In order to illustrate the coupling of the number of lasers of the first second and third primary color wavelengths (read, green and blue) measurements were performed using a conventional TFB which had been designed for a different wavelength range. FIG. 13 shows results of the measurements performed using the conventional TFB, designed for a wavelength of 980 nm, and demonstrate a measured average combined efficiency of 88% for the three primary colors.

One advantage of the system of these teachings is the ability to easily reduce speckle. A speckle pattern is a random intensity pattern produced by the mutual interference of a set of wave-fronts. Embodiments of the system of these teachings use multiple lasers (with no relative phase relation with each other), and propagation of the signals through multi mode (MM) fiber(s) (as the output fiber of the fiber optic beam combiner), hence the speckle effects are reduced. In embodiments of the system of these teachings, since the optical beams propagate through MM optical fibers, polarization scrambling can be incorporated by simply moving the fiber.

Exemplary measurements, shown in FIGS. 14a and 14b, show a significant improvement of the speckle effect when the fiber moves by a small air draft, produced by a computer chip fan, shown in FIG. 14b, compared to the case where the fiber is not moving, shown in FIG. 14a, (e.g., speckle contrast <0.5%, and 15%, respectively). Speckle contrast below 1% is acceptable for projection applications.

Another advantage of these teachings is the reduction in the need for homogenizing optics. Projected image quality is important in simulation and training settings. The requirement is that the edge luminance is 75% of the center luminance. In lamp based projectors a homogenizer rod is used to make the projected beam more uniform. In embodiments of the present teachings, this homogenizing functionality is performed by the optical fiber. Exemplary results, shown in FIGS. 15a-15f, show that combining the output of two lasers homogenizes the optical beam and hence generates a smoother and more uniform beam. FIGS. 15a and 15b show the output of the TFB under illumination of only one of the two lasers. FIG. 15c shows the combined output beam when both lasers are on. Also the mode mixing technique used for the speckle cancellation can improve the uniformity of the output optical beam (FIG. 15d-f). We observe that combining two beams significantly improves the beam uniformity, and we expect that additional lasers will improve it further.

These teachings allow for:

1. High combining efficiencies (e.g., >85%) for multiple (e.g., 19) beams/lasers (of any color).

2. A modular structure based on individual, detachable and exchangeable components and modules. This approach is beneficial from a system manufacturing, testing and servicing point of view.

3. Scalable design that allows for additional lasers to be interfaced to the system on a later stage.

4. Fault tolerant system, where if a laser fails or needs repair, the system can still operate at lower powers, 5 and a simple laser replacement is only required.

5. Flexibility in accommodating new optical sources and/or modulator technologies.

6. Potential for the FO-combiner to retrofit current systems.

7. Potential in accommodating additional lasers operating at different wavelengths (other than R, G, B)

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although these teachings have been described with respect to various embodiments, it should be realized these teachings are also capable of a wide variety of further and other embodiments within the spirit and scope of the appended claims.

We claim:

1. A laser based projection system comprising:
   a first plurality of laser sources; said first plurality of laser sources emitting light having substantially a first wavelength in the visible range;
   a second plurality of laser sources, said second plurality of laser sources emitting light having substantially a second wavelength in the visible range;
   a third plurality of laser sources; said third plurality of laser sources emitting light having substantially a third wavelength in the visible range;
   a fiber optic laser beam combiner combining outputs of said first plurality of laser sources into one optical fiber; wherein the fiber-optic laser beam combiner comprises a tapered fiber bundle; the fiber optic laser beam combiner combining outputs of said first plurality of laser sources, said second plurality of laser sources and said third plurality of laser sources into one optical fiber;
   a fiber-optic delivery component coupled to said one optical fiber; and
   at least one spatial light modulator; said at least one spatial light modulator receiving an output from said fiber-optic delivery component; said at least one spatial light modulator enabling image generation and projection;
   wherein said first wavelength is a wavelength of one primary color, said second wavelength is a wavelength of another primary color and said third wavelength is a wavelength of yet another primary color;
   wherein the laser-based projection system further comprises splitting components receiving said output from said fiber-optic delivery component and separating said output into beams of said one primary color, said another primary color and said yet another primary color; and
   wherein the at least one spatial light modulator comprises three spatial light modulators; one of said three spatial light modulators receiving light of said one primary color; another one of said three spatial light modulators receiving light of said another primary color; and yet another one of said three spatial light modulators receiving light of said yet another primary color; said spatial light modulators enabling image generation and projection.

2. The laser-based projection system of claim 1 further comprising at least one other laser source; said at least one other laser source emitting light having substantially a fourth wavelength in the visible range.

3. The laser-based projection system of claim 1 wherein a diameter of said one optical fiber is at most 400 microns.

4. The laser-based projection system of claim 1 wherein said fiber-optic delivery component is said one optical fiber.

5. A laser-based projection system comprising:
   a first plurality of laser sources; said first plurality of laser sources emitting light having substantially a first wavelength in the visible range;
   a second plurality of laser sources, said second plurality of laser sources emitting light having substantially a second wavelength in the visible range;
   a third plurality of laser sources; said third plurality of laser sources emitting light having substantially a third wavelength in the visible range;
   a fiber optic laser beam combiner combining outputs of said first plurality of laser sources into one optical fiber; the fiber optic laser beam combiner combining outputs of said first plurality of laser sources, said second plurality of laser sources and said third plurality of laser sources into one optical fiber;
   a fiber-optic delivery component coupled to said one optical fiber; and
   at least one spatial light modulator; said at least one spatial light modulator receiving an output from said fiber-optic delivery component; said at least one spatial light modulator enabling image generation and projection;
   the laser-based projection system further comprising:
   polarization beam splitting component receiving said output from said fiber-optic delivery component; said polarization beam splitting components splitting received light into beams of light of two polarizations; and
   one pair of optical power monitoring components; said one pair of optical power monitoring components monitoring optical power of light of one polarization and of another polarization;
   an optical power control component receiving an output from said optical power monitoring components and adjusting optical power such that optical power in said one polarization is about equal to optical power in said another polarization;
   a polarization combining component combining a beam of light of said one polarization with a beam of light of said another polarization, after the adjusting of optical power; and
   wherein said at least one spatial light modulator comprises two spatial light modulators, one spatial light modulator modulating light of said one polarization and another spatial light modulator modulating light of said another polarization.

6. A laser-based projection system comprising:
   a first plurality of laser sources; said first plurality of laser sources emitting light having substantially a first wavelength in the visible range;
   a fiber optic laser beam combiner combining outputs of said first plurality of laser sources into one optical fiber; wherein the fiber-optic laser beam combiner comprises a tapered fiber bundle;

a fiber-optic delivery component coupled to said one optical fiber;

at least one spatial light modulator; said at least one spatial light modulator receiving an output from said fiber-optic delivery component; said at least one spatial light modulator enabling image generation and projection;

a second plurality of laser sources, said second plurality of laser sources emitting light having substantially a second wavelength in the visible range;

another fiber optic laser beam combiner combining outputs of said second plurality of laser sources into another optical fiber; wherein said another fiber-optic laser beam combiner comprises a tapered fiber bundle;

another fiber-optic delivery component coupled to said another optical fiber; and another spatial light modulator receiving an output from said another fiber-optic delivery component.

7. The laser-based projection system of claim 6 further comprising:

a third plurality of laser sources, said third plurality of laser sources emitting light having substantially a third wavelength in the visible range;

yet another fiber optic laser beam combiner combining outputs of said third plurality of laser sources into yet another optical fiber; wherein said yet another fiber-optic laser beam combiner comprises a tapered fiber bundle;

yet another fiber-optic delivery component coupled to said yet another optical fiber; and yet another spatial light modulator receiving an output from said yet another fiber-optic delivery component.

8. The laser-based projection system of claim 7 wherein said first wavelength is a wavelength of one primary color, said second wavelength is a wavelength of another primary color and said third wavelength is a wavelength of yet another primary color.

9. The laser-based projection system of claim 7 wherein said fiber-optic delivery component is said one optical fiber, said another fiber-optic delivery component is said another optical fiber and said yet another fiber-optic delivery component is said yet another optical fiber.

10. A laser-based projection system comprising:

a first plurality of laser sources; said first plurality of laser sources emitting light having substantially a first wavelength in the visible range;

a fiber optic laser beam combiner combining outputs of said first plurality of laser sources into one optical fiber;

a fiber-optic delivery component coupled to said one optical fiber; and at least one spatial light modulator; said at least one spatial light modulator receiving an output from said fiber-optic delivery component; said at least one spatial light modulator enabling image generation and projection;

a second plurality of laser sources, said second plurality of laser sources emitting light having substantially a second wavelength in the visible range;

another fiber optic laser beam combiner combining outputs of said second plurality of laser sources into another optical fiber;

another fiber-optic delivery component coupled to said another optical fiber; and another spatial light modulator receiving an output from said another fiber-optic delivery component; and a third plurality of laser sources, said third plurality of laser sources emitting light having substantially a third wavelength in the visible range;

yet another fiber optic laser beam combiner combining outputs of said third plurality of laser sources into yet another optical fiber;

yet another fiber-optic delivery component coupled to said yet another optical fiber; and yet another spatial light modulator receiving an output from said yet another fiber-optic delivery component;

wherein said first wavelength is a wavelength of one primary color, said second wavelength is a wavelength of another primary color and said third wavelength is a wavelength of yet another primary color;

the laser-based projection system further comprising:

a number of polarization beam splitting components; one polarization beam splitting component receiving light of said one primary color from said fiber-optic delivery component; another polarization beam splitting component receiving light of said another primary color from said another fiber-optic delivery component; and another polarization beam splitting component receiving light of said yet another primary color from said yet another fiber-optic delivery component; each one of said polarization beam splitting components splitting received light into beams of light of two polarizations;

optical power monitoring components; one pair of optical power monitoring components monitoring optical power of light of said one primary color of one polarization and of another polarization; another pair of optical power monitoring components monitoring optical power of light of said another primary color of one polarization and of another polarization; yet another pair of optical power monitoring components monitoring optical power of light of said yet another primary color of one polarization and of another polarization;

an optical power control component receiving an output from said optical power monitoring components and adjusting optical power such that optical power in said one polarization is about equal to optical power in said another polarization for light of said one primary color and light of said another primary color and for light of said yet another primary color;

a beam combining component combining light of said one primary color of said one polarization and light of said another primary color of said one polarization and light of said yet another primary color of said one polarization into combined light of said one polarization and combining light of said one primary color of said another polarization and light of said another primary color of said another polarization and for light of said yet another primary color of said another polarization into combined light of said another polarization; and wherein said at least one spatial light modulator comprises a pair of spatial light modulators; one spatial modulator from said pair receiving said combined light of said one polarization and another spatial light modulator from the pair receiving combined light of said another polarization.

11. A laser-based projection system comprising:

a first plurality of laser sources; said first plurality of laser sources emitting light having substantially a first wavelength in the visible range;

a second plurality of laser sources, said second plurality of laser sources emitting light having substantially a second wavelength in the visible range;
a third plurality of laser sources; said third plurality of laser sources emitting light having substantially a third wavelength in the visible range;
a fiber optic laser beam combiner combining outputs of said first plurality of laser sources into one optical fiber;
the fiber optic laser beam combiner combining outputs of said first plurality of laser sources, said second plurality of laser sources and said third plurality of laser sources into one optical fiber;
a fiber-optic delivery component coupled to said one optical fiber; and
at least one spatial light modulator; said at least one spatial light modulator receiving an output from said fiber-optic delivery component; said at least one spatial light modulator enabling image generation and projection;
wherein said first wavelength is a wavelength of one primary color, said second wavelength is a wavelength of another primary color and said third wavelength is a wavelength of yet another primary color;
the laser-based projection system further comprising:
  splitting components receiving said output from said fiber-optic delivery component and separating said output into beams of said one primary color, said another primary color and said yet another primary color;
  polarization beam splitting components; one polarization beam splitting component receiving light of said one primary color, said another polarization beam splitting component receiving light of said another primary color; and said another polarization beam splitting component receiving light of said yet another primary color; said polarization beam splitting components splitting received light into beams of light of two polarizations;
optical power monitoring components; one pair of optical power monitoring components monitoring optical power of light of said one primary color of one polarization and of another polarization; another pair of optical power monitoring components monitoring optical power of light of said another primary color of one polarization and of another polarization; yet another pair of optical power monitoring components monitoring optical power of light of said yet another primary color of one polarization and of another polarization;
an optical power control component receiving an output from said optical power monitoring components and adjusting optical power such that optical power in said one polarization is about equal to optical power in said another polarization for light of said one primary color and light of said another primary color and for light of said yet another primary color; and
wherein said at least one spatial light modulator comprises at least three pairs of spatial light modulators; one spatial modulator of a first pair receiving light of said one primary color of said one polarization and another spatial light modulator of the first pair receiving light of said another polarization of said one primary color; one spatial light modulator of the second pair receiving light of said another primary color of said one polarization and another spatial light modulator of the second pair receiving light of said another primary color of said another polarization; and one second light modulator of said third pair receiving light of said yet another primary color of said one polarization and of said another polarization, after optical power has been adjusted by said optical power control component; each pair of said spatial light modulators modulating light of said one polarization and said another polarization separately.

12. A laser-based projection comprising:
a first plurality of laser sources; said first plurality of laser sources emitting light having substantially a first wavelength in the visible range;
a second plurality of laser sources, said second plurality of laser sources emitting light having substantially a second wavelength in the visible range;
a third plurality of laser sources; said third plurality of laser sources emitting light having substantially a third wavelength in the visible range;
a fiber optic laser beam combiner combining outputs of said first plurality of laser sources into one optical fiber;
the fiber optic laser beam combiner combining outputs of said first plurality of laser sources, said second plurality of laser sources and said third plurality of laser sources into one optical fiber;
a fiber-optic delivery component coupled to said one optical fiber; and
at least one spatial light modulator; said at least one spatial light modulator receiving an output from said fiber-optic delivery component; said at least one spatial light modulator enabling image generation and projection;
wherein said first wavelength is a wavelength of one primary color, said second wavelength is a wavelength of another primary color and said third wavelength is a wavelength of yet another primary color;
the laser-based projection system further comprising:
  splitting components receiving said output from said fiber-optic delivery component and separating said output into beams of said one primary color, said another primary color and said yet another primary color;
  polarization beam splitting components; one polarization beam splitting component receiving light of said one primary color, said another polarization beam splitting component receiving light of said another primary color; and said another polarization beam splitting component receiving light of said yet another primary color; said polarization beam splitting components splitting received light into beams of light of two polarizations;
optical power monitoring components; one pair of optical power monitoring components monitoring optical power of light of said one primary color of one polarization and of another polarization; another pair of optical power monitoring components monitoring optical power of light of said another primary color of one polarization and of another polarization; yet another pair of optical power monitoring components monitoring optical power of light of said yet another primary color of one polarization and of another polarization;
an optical power control component receiving an output from said optical power monitoring components and adjusting optical power such that optical power in said one polarization is about equal to optical power in said another polarization for light of said one primary color and light of said another primary color and for light of said yet another primary color;
a beam combining component combining light of said one primary color of said one polarization and light of said another primary color of said one polarization and light of said yet another primary color of said one polarization into combined light of said one polarization and combining light of said one primary color of said another polarization and light of said another primary color offset another polarization and for light of said yet another primary color of said another polarization into combined light of said another polarization; said beam combining component receiving light after being adjusted by said optical power control component; and wherein said at least one spatial light modulator comprises a pair of spatial light modulators; one spatial modulator from said pair receiving said combined light of said one polarization and another spatial light modulator from the pair receiving combined light of said another polarization.

13. A method for overcoming optical power limitations in a laser projection system, the method comprising:

providing output from a first plurality of laser sources to a fiber-optic beam combiner; said first plurality of laser sources emitting light having substantially a first wavelength in the visible range; wherein the fiber-optic laser beam combiner comprises a tapered fiber bundle;

providing output from a second plurality of laser sources to the fiber-optic beam combiner, said second plurality of laser sources emitting light having substantially a second wavelength in the visible range;

providing output from a third plurality of laser sources to the fiber-optic beam combiner; said third plurality of laser sources emitting light having substantially a third wavelength in the visible range;

combining, using the fiber-optic beam combiner, output of the first plurality of laser sources, the second plurality of laser sources and the third plurality of laser sources into one optical fiber; and delivering light from the one optical fiber to three spatial light modulators for projection;

wherein said first wavelength is a wavelength of one primary color, said second wavelength is a wavelength of another primary color and said third wavelength is a wavelength of yet another primary color;

wherein the laser-based projection system further comprises splitting components receiving output from the one optical fiber and separating said output into beams of said one primary color, said another primary color and said yet another primary color; and wherein one of said three spatial light modulators receives light of said one primary color; another one of said three spatial light modulators receives light of said another primary color; and yet another one of said three spatial light modulators receives light of said yet another primary color; said spatial light modulators enabling image generation and projection;

whereby optical power limitations are overcome by combining the first plurality of laser source, the second plurality of laser sources and the third plurality of laser sources.

* * * * *